United States Patent [19]

Huynh

[11] Patent Number: 5,020,231

[45] Date of Patent: Jun. 4, 1991

[54] WHEEL ALIGNMENT TOOL

[76] Inventor: Nichol Huynh, 505 Harr Dr. #G, Midwest City, Okla. 73110

[21] Appl. No.: 358,070

[22] Filed: May 30, 1989

[51] Int. Cl.⁵ .............................................. G01B 5/255
[52] U.S. Cl. .................................... 33/203.18; 33/336; 33/645
[58] Field of Search ...................... 33/203.18, 645, 288, 33/286, 336, 203, 203.19, 203.2

[56] References Cited

U.S. PATENT DOCUMENTS

| | | | |
|---|---|---|---|
| 1,763,441 | 6/1930 | Richardson | 33/203 |
| 2,028,622 | 1/1936 | Phelps | 33/203 |
| 3,161,965 | 12/1964 | Taylor | 33/203 |
| 3,234,656 | 2/1966 | MacMillan | 33/336 |
| 3,266,150 | 8/1966 | Mussano | 33/203.18 |
| 3,445,936 | 5/1969 | Wilkerson | 33/203.18 |
| 3,869,798 | 3/1975 | Wilkerson | 33/336 |
| 3,901,094 | 8/1975 | Humbert | 33/336 |
| 4,271,599 | 6/1981 | Pavitt | 33/336 |
| 4,546,548 | 10/1985 | Bullock, Sr. | 33/336 |
| 4,771,546 | 9/1988 | Cavazos | 33/336 |

FOREIGN PATENT DOCUMENTS

| | | | |
|---|---|---|---|
| 1919945 | 4/1971 | Fed. Rep. of Germany | 33/336 |
| 2025064 | 1/1980 | United Kingdom | 33/336 |

OTHER PUBLICATIONS

Kwik-Ezee Camber and Caster Compensators 12-1948 (pages unknown) both sides.

Primary Examiner—William A. Cuchlinski, Jr.
Assistant Examiner—C. W. Fulton

[57] ABSTRACT

A wheel alignment device comsists of a pair of identical tools. Each has a protractor with teeth mesh with a gradutated gear at which an indicator points at. A string connects the protractors' centers. An equivalence has a protractor with teeth mesh with a gear which meshes with a sleeve or worm gear travels on a bolt and along a scale. As the sleeve rotates around the bolt it turns the gear and the protractor. A string connects the protractors' centers. The tools above are located on a plane parallel to the wheel's axle and perpendicular to the vertical line for toe angle measurements. The tools above are located on a plane parallel both to the wheel's axle and the vertical line for camber measurement only or replacing the connecting string by attaching a plumb line to the center or a level vial to the zero mark of the protractor for both camber and caster measurements. A tool measures the steering angle of a wheel comprises a sliding block that has a protractor on top and a guiding pin at the center of the protractor to allow an indicator which is fixed to the wheel to rotate and translate about the protractor. As the wheels turns, the indicator acts on the guiding pin to push the sliding block along the guiding track. The angular displacement of the wheel is the intersection of the indicator and the protractor.

5 Claims, 3 Drawing Sheets

5,020,231

WHEEL ALIGNMENT TOOL

BACKGROUND - FIELD OF INVENTION

This alignment tool is used to align automobile wheels. The tool measures the toe, camber, and caster angles of the wheels. The tool's simple construction and ease of use facilitates home use if the user understands adjustment of toe-in, camber, and caster.

BACKGROUND - DESCRIPTION OF PRIOR ART

The way that an automobile handles is largely dependent upon the alignment of its wheels. Therefore, a wide variety of tools are dedicated to wheel alignment.

All of the alignment tools currently on the market are expensive and require elaborate training and setup. Several tools and a perfectly level floor are required to perform wheel alignment. A typical alignment tool consists of a device to check toe angle, a device to check camber, a device to check caster, and a set of turntables to check steering angle (change of the wheel's direction). The camber and caster measurements can be obtained from a single device. Usually, three devices are required in an alignment tool: toe-angle measuring device, camber-caster measuring device, and a set of turntables. All previous tools are made of metal and are heavy, bulky, and relatively non-portable.

OBJECTS AND ADVANTAGE

Accordingly, my invention easily, reliably, and inexpensively measures toe, camber, and caster angles of a wheel. The tool requires minimum setup, training, and skill to use. My wheel alignment tool is lightweight and can be used in all home garages.

Readers will find further objects and advantages of the invention throughout the ensuing descriptions and the accompanying drawings.

DRAWINGS - BRIEF DESCRIPTION

Figure 2:
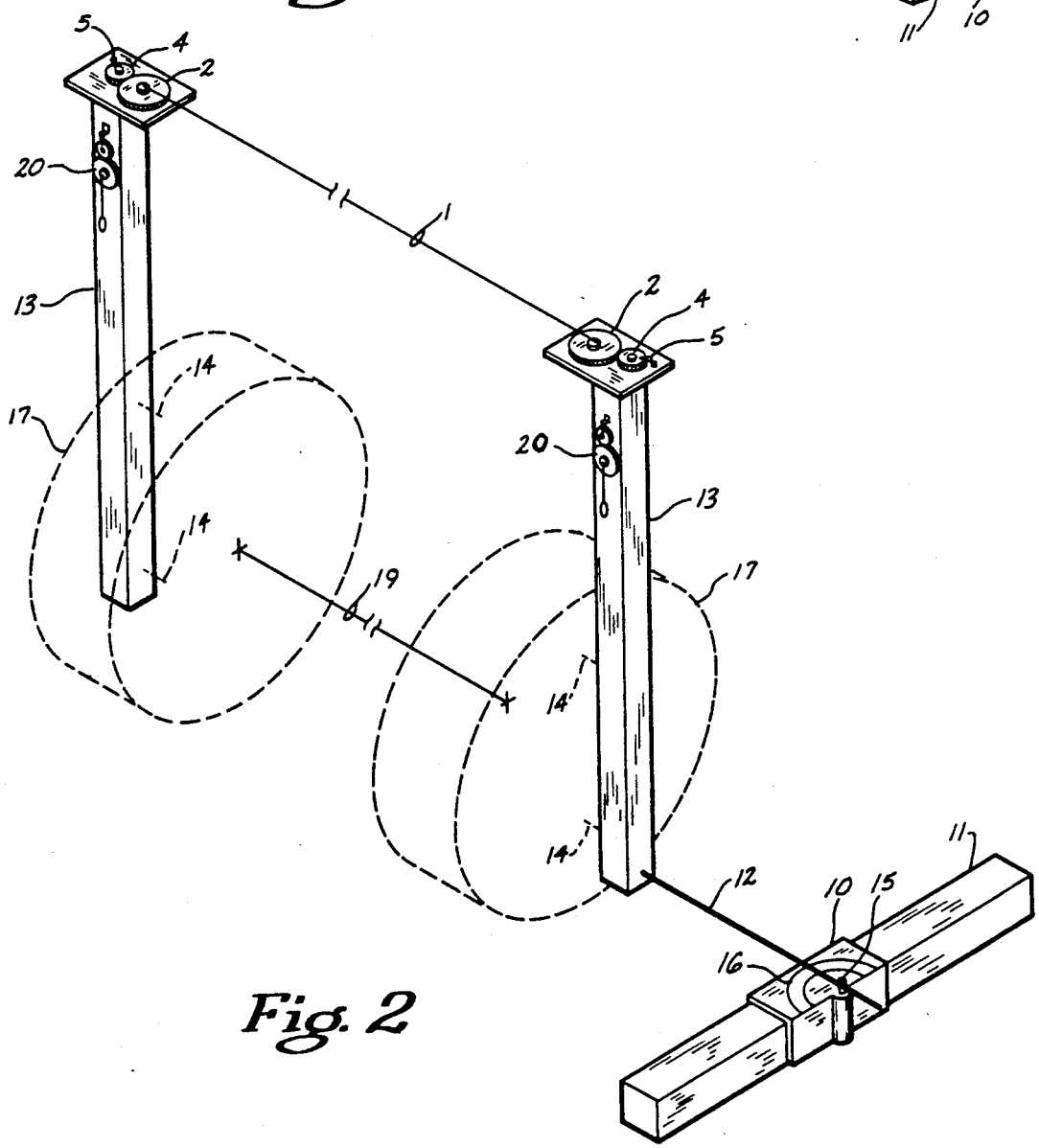
FIG. 2 shows a view of the steering-angle measuring device with the indicator (12) connected to the alignment tool body (13) with any mounting brackets (14).
Figure 3:
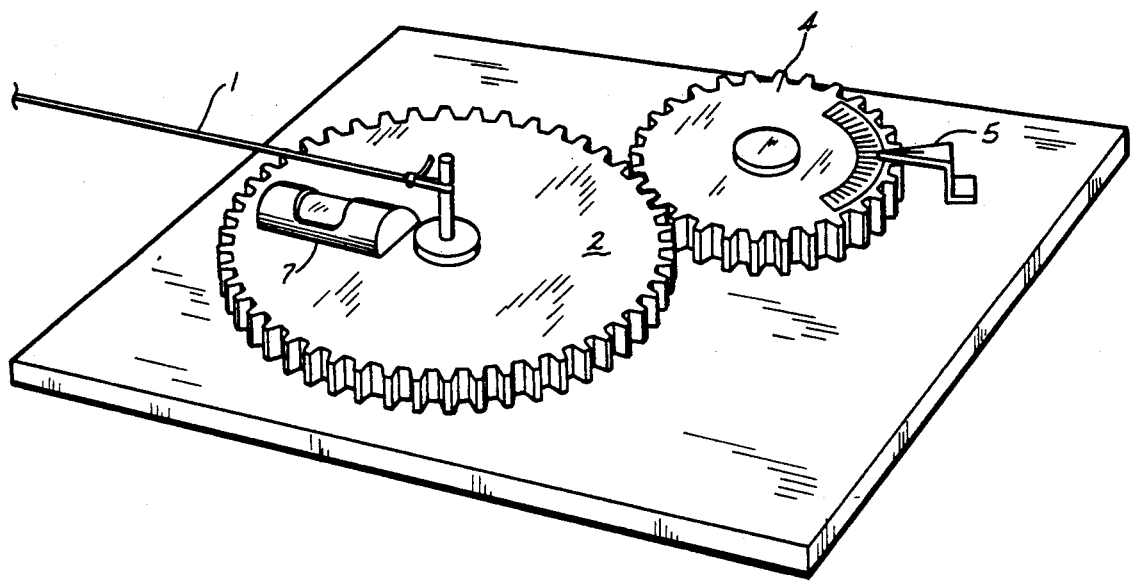
Figure 4:
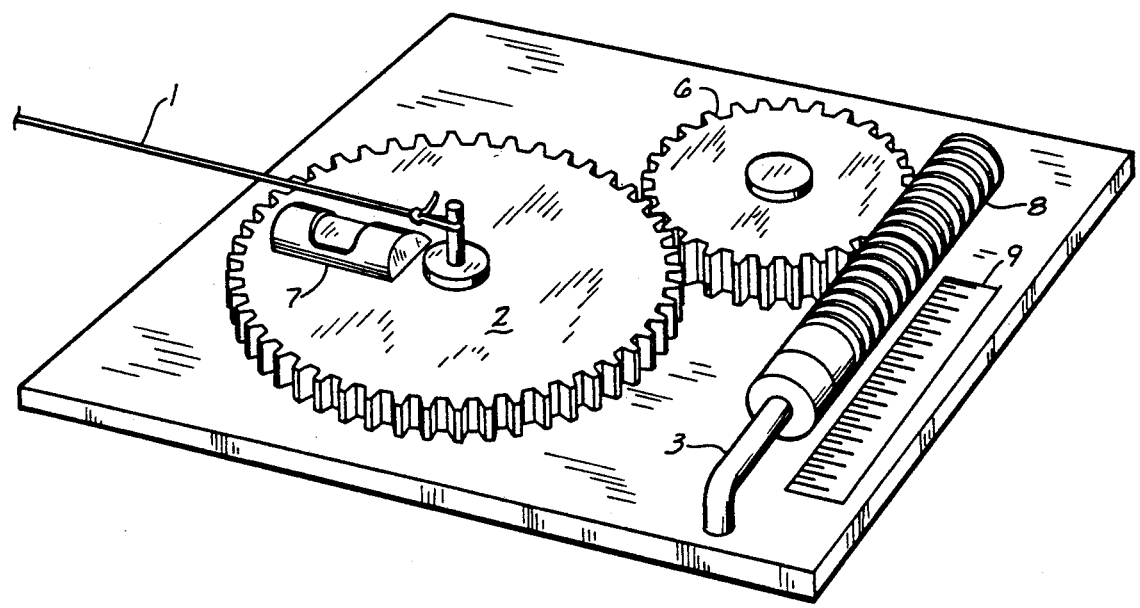

FIG. 3 is a view of the circular protractor (2) which rotates about its center. A string connects the centers of the protractors (2) on top of the alignment tool. Small angular displacement of the protractor (2) shows a larger angular displacement on the gear (4) with angular scale reference to the indicator (5). The protractor (2) and the gear (4) with the scale are interconnected by gear teeth. For toe-angle measurement, the gear system in FIG. 3 is set on top of the alignment tool which is perpendicular to a vertical line (shown in FIG. 1). For camber- and/or caster-angle measurement, the gear system in FIG. 3 or FIG. 4 is set on the alignment tool's side that is parallel to the wheel rotation axis, and the vertical line (shown in FIGS. 1 and 2). Vial (7) or a plumb bob is used as a vertical line reference for camber and caster measurements.

FIG. 4 shows view of the circular protractor (2) with the gear (6), and the sleeve (8). The sleeve (8) has gear teeth to match with the gear (6) at one end and female threads for the bolt (3) at the other end. This sleeve (8) has both translational and rotational movements. Because the bolt (3) is fixed, the sleeve (8) translates along the bolt (3). Translational movement of the sleeve (8) rotates the gear (6) and the protractor (2). This translational movement of the sleeve (8) is measured on a scale (9). Set up for toe, camber, and caster measurement is similar to that in FIG. 3.

Figure 5:
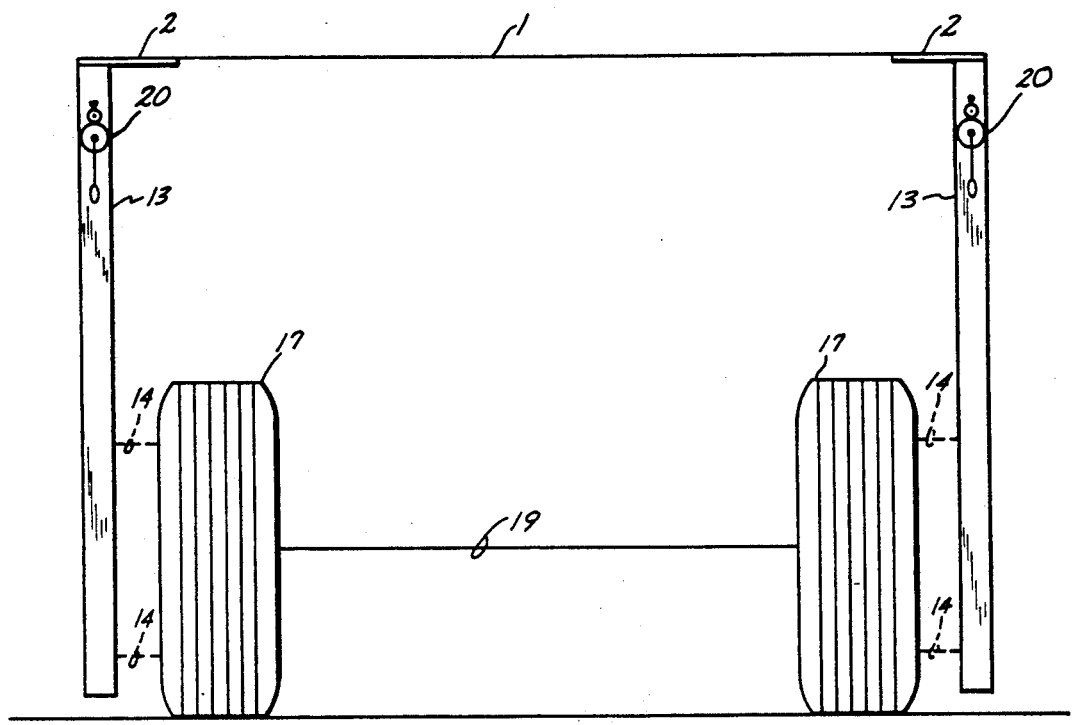

FIG. 5 is a front view of the alignment tools are attached on the wheels.

Figure 6:
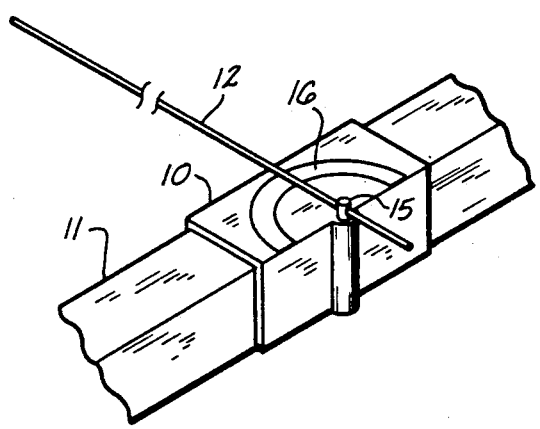

FIG. 6 is a view of the steering-angle measuring tool with its components. The steering-angle measuring device is comprised of the sliding block (10), the guiding track (11), the indicator (12), the guiding pin (15), and the protractor (16). The indicator (12) on the alignment tool body (13) goes through an opening in the guiding pin (15) and pushes the sliding block (10) along the sliding track (11).

Figure 7:
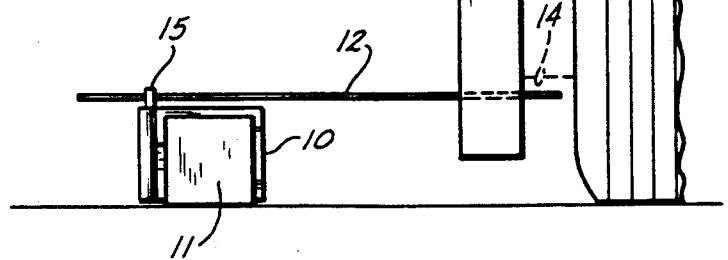

FIG. 7 is a front view of an alignment tool with the angular measuring device.

DRAWINGS - DETAILED DESCRIPTIONS

1. This string connects the circular protractors' centers for angle indication. When the string (1) coincides with the zero mark or vial (7) on circular protractor (2), the two wheels are pointing straight ahead.

2. The circular or 360 degrees protractor has gear teeth on its circumference to match a gear with scale for angle measurements. The scale on the gear is referenced to a fixed indicator.

3. This bolt is fixed to the alignment tool to give the sleeve (8) translational movement when the sleeve (8) threads around the bolt (3). The bolt (3) has male threads, and the sleeve (8) has female threads. Bolt (3) and sleeve (8) can be threadless.

4. The gear has a scale for angular or converted linear displacements which is angular displacement multiplied by the tire's radius.

5. The indicator is fixed to the alignment tool's body (13).

6. The gear matches to both the circular protractor (2) and the gear teeth of sleeve (8). When the sleeve (8) turns, its translational movement rotates the gear (6) and the circular protractor (2).

7. The level vial is used for horizontal or vertical references. When the vial (7) is attached to the circular protractor (2), the gear systems in FIGS. 3 and 4 can be used for camber- and caster-angle measurements. These gear systems in FIGS. 3 and 4 are fixed to the side of the alignment tool that parallels the wheel's axle for camber and caster measurements. Level vial (7) is also a zero mark referent on protractor (2). Level vial (7) is equivalent to a plumb bob.

8. The sleeve has either worm gear teeth or regular gear teeth that match the gear (6). The sleeve (8) has female threads that engage with the male threads of the bolt (3). The sleeve (8) also has a mark around its diameter that serves as an indicator with reference to a fixed scale (9) for translational movement measurement.

9. This fixed scale shows either angular or linear displacements. For caster measurement, the scale (9) can move to zero with the mark on the sleeve (8).

10. The sliding block moves along a guiding track (11) in response to the action of the indicator (12) on the guiding pin (15) inside the hole of the sliding block (10).

11. The guiding track guides the sliding block (10) parallel to the forward direction of the car.

12. The indicator is fixed to the alignment tool's body (13). The indicator (12) slides through the guiding pin

(15) to push the guiding block (10) along the guiding track (11).

13. The alignment tool's body has different measuring and holding devices attached.

Figure 1:
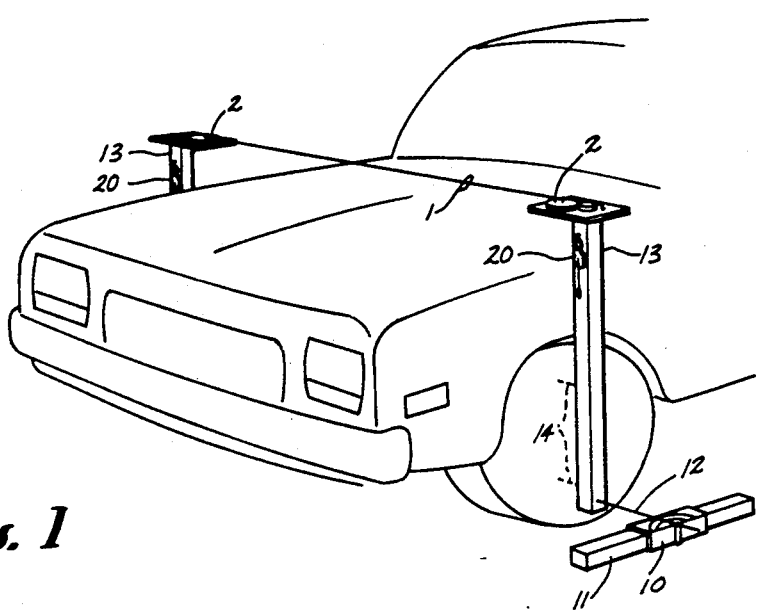
FIG. 1 shows the alignment tool installed on wheels in a vertical position for toe, camber, and caster measurements.

14. Any mounting bracket attaches the alignment tool to the wheel as shown in FIGS. 1 and 2.

15. The guiding pin guides the indicator (12) through its hole. The guiding pin (15) rotates and translates inside the hole of the sliding block (10).

16. The protractor is mounted on top of the sliding block (10). The protractor's center coincides with the hole of the sliding block (10) through which the guiding pin (15) goes.

17. The automobile's wheel is to be aligned with the tool.

19. The wheel's axle

20. The gear system in FIG. 3 with a plumb bob for vertical reference is set up for camber and caster measurement.

TOOL DESCRIPTION

This patent only concerns the toe, camber, and caster measuring devices. The alignment tool can be mounted on a wheel by any device that positions the tool as shown in FIGS. 1 and 2.

The first toe-angle measuring device in FIG. 3 consists of a circular protractor (2), a gear (4) with a scale, and an indicator (5). Locate the first toe-angle measuring device on a plane that is parallel to the wheel's axle and perpendicular to the vertical line. When the wheels are at straight ahead direction, the zero mark or vial (7) on the circular protractor (2) coincides with the line (1) connecting the protractors' centers. When the wheels are not turned straight ahead, the zero mark does not coincide with the line (1). Turn the gear (4) to line up the zero mark with the line (1). The amount of angular displacement from the forward direction is the intersection of the indicator (5) and the scale on the gear (4).

The second toe-angle measuring device consists of a circular protractor (2), a gear (6) with or without scales, a sleeve (8) with gear teeth matching those of the gear (6) at one end and female threads at the other end, a bolt (3), and a scale (9) in FIG. 4. Rotational centers of the circular protractor (2) and the gear (6) are fixed to the body (13). The bolt (3) and scale (9) are fixed to the body (13). This second toe-angle measuring device is equivalent to first toe-angle measuring device. Turn the sleeve (8) to line up the zero mark with the line (1). The intersection of a mark on the sleeve (8) with the scale (9) give angular displacement.

The first camber and caster angle measuring device is similar to the first toe-angle measuring device item (20) in FIG. 1 or 2. When the level vial's bubble is centered, the alignment tool is parallel to a vertical line, zero camber. If the bubble is not centered, turn the gear (4) to center the bubble. The angular displacement from the vertical line is indicated at the intersection of the scale on the gear (4) and the indicator (5). Caster is the change in camber when the wheel steers through a certain angle. For caster measuring, turn the desired wheel inward 20 degrees, center the vial's bubble, and note the angular displacement. .Turn the desired wheel past zero and 20 degrees outward, and note the angular displacement. The difference between the first and second camber values is the caster angle. For camber and caster measurement, the scale on the gear (4) and the scale (9) are moveable so that each can be zeroed with its respective indicator.

The second camber and caster angle measuring device is similar to the first toe-angle measuring device. Turn the sleeve (8) to center the level vial's bubble. The intersection of the mark on the sleeve (8) and the scale (9) is the angular displacement from the zero camber reference. Caster measurement is similar to the one above.

STEERING-ANGLE MEASURING DEVICE

The steering-angle measuring device consists of a protractor (16) mounted on a sliding block (10), an indicator (12) connected to the alignment tool, a guiding track (11) and a guiding pin (15).

Set the wheels in the straight ahead direction. Mount the indicator (12) to the alignment tool so that the indicator is perpendicular to the forward direction. Install the sliding block (10) with the protractor (16) onto the indicator (12) by guiding the indicator (12) through the hole on the guiding pin (15). Slide the guiding track (11) through the square opening on the sliding block (10). Rotate the guiding track (11) so that the indicator (12) points at the 0 degree mark. This indication means that the guiding track (11) is pointing straight ahead.

Turn the wheels to force the indicator (12) slides through the guiding pin (15) which then makes the sliding block (10) move along the guiding track (11). Since the sliding block (10) moves along the guiding track (11), the protractor (16) on the sliding block does not have any angular displacement. The indicator (12) is fixed to the wheel; therefore, it changes directions with the wheel. The angular displacement of the wheel from the straight-ahead direction is determined by the intersection of the indicator (12) and the angular scale on the protractor (16).

TOOL VARIATIONS

The above descriptions should not be perceived as limitations on the scope of the invention; they are only examples of preferred configurations of this tool. One or more components can be changed without changing the original function of the device. The dimensions and shapes of various components can be changed. Different materials can be used to make the tool, i.e., aluminum, steel, composites, wood or plastics.

Protractors (2) and (16) can be varied by changing their shapes to ellipse, sphere, cylinder, cone, or polygonals. The contacts between the protractors (2) and their gears (4) and (6) can be smooth without gear teeth or have belt and pulley systems.

The indicator (5) of FIG. 3 can be fixed to the rotation axis of the gear (4).

The gear system in FIG. 4 can have a sleeve (8) with a worm gear at one end and male threads at the other end. An indicator with female threads may have a tab to slide along the slotted scale (9) when the sleeve (8) rotates around threadless bolts (3) or a rod. The scale (9) can be either fixed or moveable parallel to the sleeve (8) with the mark on sleeve (8) being replaced by an indicator fixed to the alignment tool body (13).

Electronic sensors and amplifiers can replace the gear (4) and the scale (9).

The following paragraphs mention only parts of the angle measuring device that are changed while the rest of the device remains the same.

The guiding track (11) and sliding block (10) can be a railed or grooved system. The guiding track (11) can be curved and have a cross section of any shape. The sliding block (10) has shapes that follow cross sections of the guiding track (11).

The indicator (12) can be fixed to the guiding pin (15) and slipped through the alignment tool body (13).

The protractor (16) can be fixed to the alignment tool body (13) with an indicator (12) that rotates around the center of the protractor (16).

The protractor (16) can also be fixed to the indicator (12) instead of the sliding block (10), and the indicator (12) is fixed to the guiding pin (15). The indicator (12) slides through the body (13), and the sliding block (10) has a mark to show angular displacement of the protractor (16).

The protractor (16) can be positioned between the sliding block (10) and the body (13) with half of the indicator (12) fixed to the sliding block (10) and the other half fixed to the body (13). Both halves slide by the center of the protractor (16).

The indicator (12) can be fixed to the sliding block (10), and it rotates and translates at the center of the protractor (16) which is fixed to the body (13).

I claim:

1. A tool for measuring the steering angle of a wheel consists of a sliding block, a guiding track, a guiding pin, a protractor, and an indicator; said indicator is fixed to said tool's body, and it slides through said guiding pin to push said sliding block with said protractor on top along said guiding track; said guiding track is means to keep said sliding block moving in one direction; said guiding pin is means to allow said indicator to translate and rotate at the center of said protractor; therefore, said steering angle measuring tool comprises means to keep said protractor traveling in one direction and means to show angular displacement of said wheel on said protractor from said direction.

2. A tool of claim 1 comprises said guiding track is means for said sliding block to follow on.

3. A tool of claim 1 comprises said protractor is fixed to either said indicator, or said guiding pin.

4. A tool of claim 1 comprises said guiding pin is means to accommodate said indicator and allow said indicator to rotate and translate with respect to said sliding block.

5. A tool of claim 1 comprises said indicator is means to show angular displacement of said alignment tool body from said guiding track.

* * * * *